United States Patent

Matoba et al.

[11] Patent Number: 5,301,174
[45] Date of Patent: Apr. 5, 1994

[54] OPTICAL DISK RECORDING AND REPRODUCING APPARATUS

[75] Inventors: Hirotsugu Matoba, Sakurai; Masaru Nomura, Tenri; Toshihisa Deguchi, Nara; Shigeo Terashima, Tenri, all of Japan

[73] Assignee: Sharp Kabushiki Kaisha, Osaka, Japan

[21] Appl. No.: 550,973

[22] Filed: Jul. 11, 1990

[30] Foreign Application Priority Data

Jul. 14, 1989 [JP] Japan ................. 1-183433
Jul. 14, 1989 [JP] Japan ................. 1-183434

[51] Int. Cl.$^5$ ................. G11B 7/00
[52] U.S. Cl. ................. 369/44.28; 369/44.29; 369/44.32; 369/44.25; 369/44.35; 360/78.06
[58] Field of Search ........... 369/44.28, 44.29, 32, 369/44.27, 44.32, 44.25, 44.35, 44.11, 44.34; 360/78.06, 73.03, 78.09, 78.06, 78.12, 78.07

[56] References Cited

U.S. PATENT DOCUMENTS

| | | |
|---|---|---|
| 4,591,933 | 5/1986 | Quackenbush . |
| 4,622,604 | 11/1986 | Hashimoto et al. . |
| 4,837,757 | 6/1989 | Okada et al. . |
| 4,907,109 | 3/1990 | Senio ................. 360/78.12 |
| 5,038,333 | 8/1991 | Chow et al. ................. 369/44.29 |
| 5,056,072 | 10/1991 | Wachi ................. 369/32 |
| 5,063,549 | 11/1991 | Yamamuro ................. 369/44.28 |

FOREIGN PATENT DOCUMENTS

| | | |
|---|---|---|
| 270357 | 12/1987 | European Pat. Off. . |
| 0304299 | 8/1988 | European Pat. Off. . |
| 3626029 | 2/1987 | Fed. Rep. of Germany . |
| 59-084379 | 9/1984 | Japan . |
| 59-154675 | 1/1985 | Japan . |
| 59-171080 | 2/1985 | Japan . |
| 64-4983 | 1/1989 | Japan . |
| 64-32472 | 2/1989 | Japan . |
| 2-179975 | 7/1990 | Japan . |
| WO8501145 | 3/1985 | PCT Int'l Appl. . |

OTHER PUBLICATIONS

IBM Technical Disclosure Bulletin, vol. 28, No. 7, Dec. 1985 pp. 3123—3127.

Primary Examiner—Aristotelis Psitos
Assistant Examiner—Muhammad Edun

[57] ABSTRACT

An optical disk recording and reproducing apparatus in which during coarse access, an adjustable target speed is obtained using a speed offset value stored in a speed offset memory. The speed offset value being determined between a plurality of reference velocities and a plurality of adjustable offset velocity values. The system also performs fine access within a defined distance from the optical head to the designated track upon completion of the coarse access mode. The speed offset values are continually updated by to improve the accuracy of the coarse access operation saving overall access time.

16 Claims, 14 Drawing Sheets

OPTICAL DISK RECORDING AND REPRODUCING APPARATUS

FIELD OF THE INVENTION

The present invention relates to an optical disk recording and reproducing apparatus for use in recording data on various types of optical disks and reproducing the data therefrom, and more particularly to an access control system for moving an optical head to a designated track on an optical disk.

BACKGROUND OF THE INVENTION

There have been widely known optical disk recording and reproducing apparatus for recording data on an optical disk and reproducing the data therefrom, using a semiconductor laser or similar devices. In such an optical recording and reproducing apparatus, the track access operation for moving the optical head to a designated track on an optical disk, consists of two sequential operations, i.e., coarse access and fine access.

More specifically, when the optical head is extremely far from a designated track position, (i) an access distance in a radial direction of an optical disk is first obtained from the distance between the present position of the optical head as detected by a position-detection sensor and the position of the designated track. Then, (ii) the optical head is moved to the designated track by a driving means such as a linear motor while the moving speed of the optical head is controlled in accordance with a predetermined speed table so that the movement of the optical head is approximately equalized to the access distance.

Thereafter, (iii) a light beam emitted from the optical head is adjusted to follow up the track by a tracking servo comprised of an objective lens actuating device, and a tracking pull-in operation (i.e. an operation for moving an optical head in close proximity to a designated track position) is completed, (iv) only an objective lens installed in the optical head is actuated so as to jump from one track to another while track numbers are being read out and (v) the optical head is thus moved to the designated track position. In this procedure, the first series of operations (i.e. the steps (i) to (ii)) is called "coarse access" and the second series of operations (i.e. the steps (iii) to (v)) is called "fine access".

In a conventional method for performing the coarse access, an optical head is actuated to access a designated track by a linear motor and its control circuit using a speed table 60 according to which the actual moving speed of the optical head is reduced at a constant acceleration as shown in FIG. 14(a). If the actual moving speed of the optical head changes in compliance with the speed table 60 faithfully, the actual moving speed perfectly coincides with the speed table 60.

There is, however, a likelihood of speed deviation (a difference between the actual speed of the optical head and the speed table) that is proportional to the acceleration in reducing the speed (negative acceleration), when employing such a speed table 60 in a general speed control system. However, the desired deceleration cannot be obtained so that the time required for stopping the optical head is prolonged and errors often occur in measuring the moving distance of the optical head. As a result, a precise tracking pull-in operation fails prolonging the time required for the tracking pull-in operation. Further, since an abrupt change often occurs in acceleration when the optical head stops, the optical head is not fixed in a steady position and the tracking servo actuated by the objective lens actuating device also becomes unstable. Although the speed deviation can be reduced by extremely increasing the loop gain of the speed control system, this is virtually impossible since the control system becomes unstable due to mechanical resonance or other problems.

To solve the above problems, the following approach has been provided: A designated track position is accessed by an optical head using a speed table 61 using acceleration to reduce the actual speed of the optical head as the optical head approaches the designated track position, as shown in FIG. 14(b). With this arrangement, it is possible to reduce the access distance without extremely increasing the loop gain of the speed control system, by means of reducing the speed deviation at the time of a tracking pull-in operation, so that the tracking pull-in operation is stabilized. An abrupt change in acceleration at the time the optical head is suspended is also prevented and, therefore, the tracking servo control can be performed in a stable condition.

In the foregoing access method, it is impossible to read out track numbers during a coarse access operation and, therefore, the following steps are taken:

(i) a present position of the optical head is detected by a position detection sensor;

(ii) the number of tracks existing in a distance from the above position to a designated track position is obtained;

(iii) the number of tracks thus obtained is converted to an access distance and an access operation is executed based on the access distance. However, the disadvantage remains in that the accuracy of the coarse access is often deteriorates due to variations in the accuracy of the position detection sensor and the expansion/shrinkage of the optical disk that may be caused by a change in ambient temperature. As a result, it takes more time to perform the coarse access, and the time required for performing the overall access operation is accordingly prolonged.

Further, when using the speed table 61, the access operation is performed at a lower speed as the optical head approaches the designated track so that more seek time becomes necessary. The access speed is considerably slower when the optical head is somewhere short of the designated track, so that the optical head is often halted prior to commencing a tracking pull-in operation because of friction and the like. Since the transition from coarse access to fine access is executed after the optical head reaches a predetermined allowable region proximate to the designated track, if the optical head stops before reaching the above region like in the foregoing case, the operation will proceeded to fine access.

SUMMARY OF THE INVENTION

The present invention is intended to provide an optical disk recording and reproducing apparatus capable of correcting access errors of an optical head caused during coarse access, by a learning control, thereby improving the accuracy of the coarse access and reducing the overall access time.

Another object of the invention is to provide an optical disk recording and reproducing apparatus capable of stably performing a tracking pull-in operation and controlling the actual speed of the optical head during the tracking pull-in operation in order to perform reliable tracking servo control.

To achieve the above objects, an optical disk recording and reproducing apparatus according to the present invention includes:

an optical head;

calculating means for calculating an access distance, based on a present position of the optical head and a designated track position;

speed generating means for generating a speed which is determined according to the above access distance (this speed is hereinafter called "adjustable target speed"), in compliance with a speed table according to which acceleration for reducing the moving speed of the optical head as the optical head approaches the designated track, and the optical head having a predetermined speed (hereinafter called "switching point speed") at the switching point which is located just before the designated track position; and control means for generating a speed "0" to replace the adjustable target speed, judging that the optical head has reached the switching point and maintaining the speed "0" during a predetermined wait time until the optical head stops.

With such an arrangement, the deviation of the actual speed of the optical head from an adjustable target speed is prevented when the optical head is positioned in the vicinity of a designated track. This enables a stable tracking pull-in operation. Further, the optical head is moved somewhat at high speed, and the moving speed of the optical head is rapidly decreased by generating the speed of "0" to replace the adjustable target speed at the switching point located just before the designated track. This enables the seek time to be reduced, while obtaining a moving distance necessary for the access operation.

The accuracy of the coarse access is improved by setting the switching point, switching point speed and wait time in consideration of the gain characteristics of the control system. Furthermore, the influence of the above discussed rapid decrease in moving speed can be prevented by setting the above factors in consideration of the gain characteristics of the control system so that the actual speed of the optical head does not exceed a range of speed which is controllable by a tracking servo. This brings about a reliable tracking servo control, considerably reducing the access time.

To achieve the above objects, another optical disk recording and reproducing apparatus according to the present invention includes:

an optical head;

speed generating means for releasing, according to an access distance obtained from a present position of the optical head and a designated track position, a table value for an adjustable target speed;

speed offset value storing means for storing a speed offset value for adjusting an access error;

a first control means for (i) controlling the optical head based on an error signal which is obtained from the difference between the actual speed of the optical head and the adjustable target speed obtained by adding or subtracting the speed offset value stored in the speed offset value storing means to or from the table value released by the speed generating means before the optical head passes a switching point in a coarse access operation, the switching point being located just before the designated track position in a coarse access, and (ii) switching the adjustable target speed to "0" after the optical head passes the switching point; and a second control means for judging whether or not the optical head is positioned on the designated track after the completion of the coarse access and controlling the driving means to move the optical head to the vicinity of the designated track in order to perform a fine access.

In such an arrangement, in view of the fact that error is likely to occur in the access distance of the optical head due to variations in the accuracy of the position detecting means and the expansion etc. of the optical disk that may be caused by a change in ambient temperature, the speed offset values which are arranged according to the access distance are stored in the offset value storing means beforehand, and the optical head is driven at an adjustable target speed which is obtained by adding or subtracting the speed offset value to or from the table value released by the speed generating means in accordance with the access distance of the optical head in the coarse access operation. This arrangement improves the accuracy of a coarse access, and saves the overall access time.

Further, by using the speed offset value correcting means, the speed offset value is corrected when an access error occurred in a coarse access which exceeds a predetermined value, so that access error can be reduced in coarse access operations to be performed afterward. Thus, the access time can be gradually reduced as the number of access operations increases.

The invention and its various advantages will become more apparent to those skilled in the art from the ensuing detailed description of preferred embodiments, reference being made to the accompanying drawings.

BRIEF DESCRIPTION OF THE DRAWINGS

FIGS. 1 to 7 show a first embodiment of the present invention.

FIG. 2 is a block diagram showing an access control system.

FIG. 3 is an explanatory diagram showing an access distance and its corresponding speed offset memories.

FIG. 4 is a graph showing a relationship between an access distance and an adjustable target speed.

FIG. 5 is a block diagram showing a transfer function in a coarse access control system.

FIG. 6 is a graph showing a relationship between time elapsed after an optical head passes a switching point and an actual speed of the optical head in a coarse access.

FIG. 7 is a graph showing a relationship between time elapsed after the optical head passes a switching point and a moving distance of the optical head in a coarse access.

FIG. 8 is a block diagram showing a control system for an access control device.

FIG. 9 is a flow chart showing an access control.

FIG. 10 is a graph showing a relationship between an access distance and adjustable target speed that is recorded in a speed table.

FIG. 11 is a graph showing an actual speed of an optical head that is converged on "0".

FIG. 12 is a graph showing the moving distance of the optical head that is converged on a certain value.

FIG. 13 is a graph showing a relationship between an adjustable target speed and actual speed that are varied as time elapses.

DESCRIPTION OF THE EMBODIMENTS

The following description describes a first embodiment of the present invention with reference to FIGS. 1 to 7.

Figure 2:
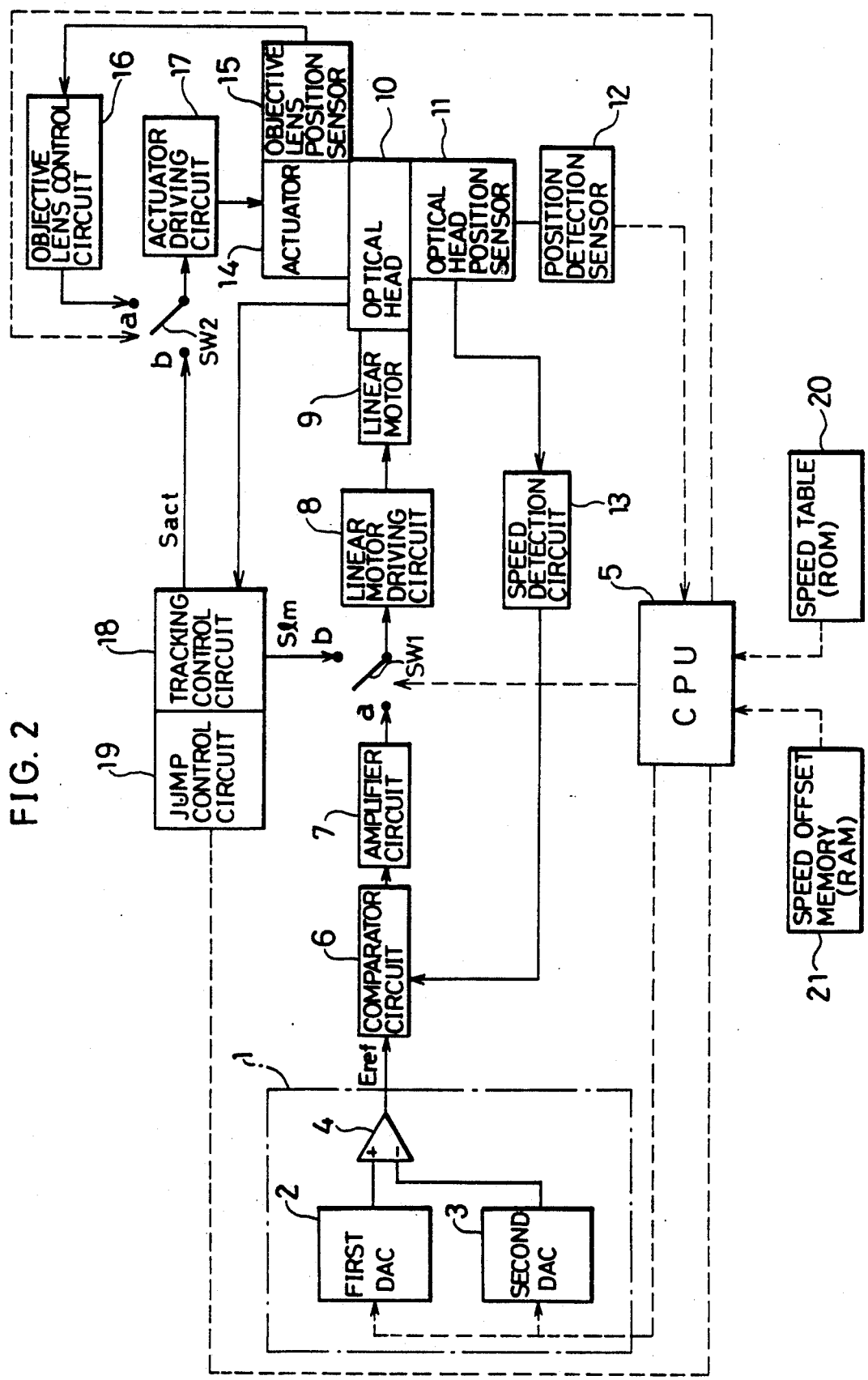

FIG. 2 shows the structure of an access control system provided in the optical disk recording and reproducing apparatus of this embodiment. This access control system includes an optical head 10; a linear motor 9 functioning as the driving means for moving the optical head 10 in a radial direction of an optical disk (not shown); an optical head position sensor 11 for generating position pulses in accordance with a position of the optical head 10 in the radial direction of the optical disk; a position detection circuit 12 functioning as the position detecting means for detecting the position of the optical head 10 by counting the number of position pulses released from the optical head position sensor 11; a speed detection circuit 13 functions as the speed detecting means for detecting a speed of the optical head 10; a speed table (Rom) 20; a speed offset memory 21 functioning as the speed offset value storing means; a CPU 5 functioning as the speed generating means, the calculating means, the speed offset value correcting means, the first control means and the second control means.

The above access control system is composed of a coarse access control system including a speed control system for moving the optical head 10 according to the speed table 20 (using positive and negative acceleration patterns of the optical head 10 during a coarse access operation) which is designed according to access distances, and a fine access control system including a tracking pull-in control system and a jump access control system. The coarse access control system is operated when a first switch SW1 and second switch SW2 are respectively connected to a contact a while the fine access control system is operated when the first and second switches SW1 and SW2 are connected to another contact b.

Firstly, there will be given an explanation of the operation of the coarse access control system which functions when the first and second switches SW1 and SW2 are connected to the contact a.

Figure 4:
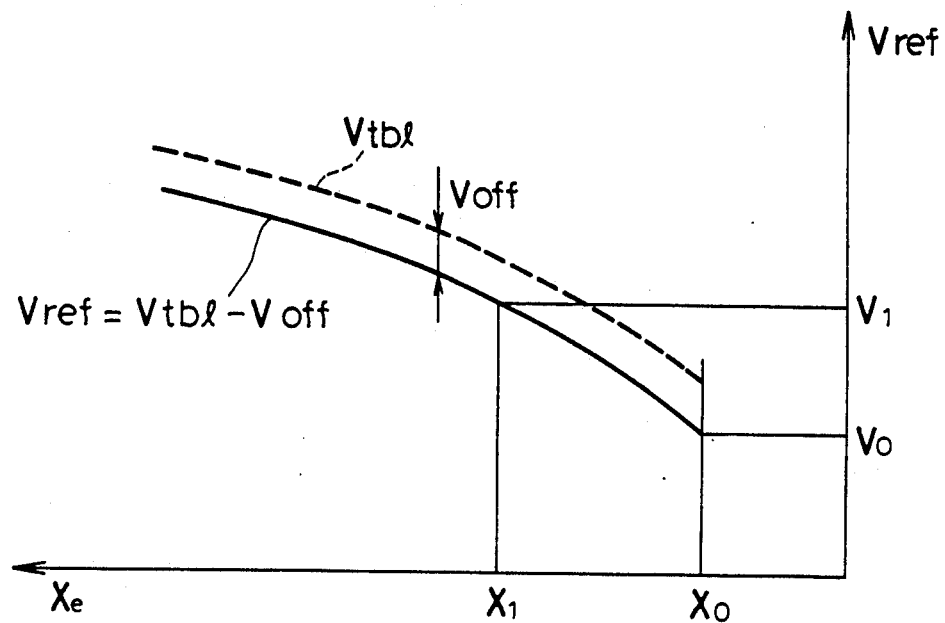

The coarse access control system performs a coarse access operation such that (i) the speed of the optical head 10 is controlled according to an adjustable target speed $V_{ref}$ which decreases as an access distance $X_e$ (i.e. a distance between a present position of the optical head 10 and the position of a designated track) decreases as indicated by the solid line of FIG. 4, and (ii) the adjustable target speed $V_{ref}$ is switched to "0" at the time the access distance $X_e$ obtained by the position detection circuit 12 decreases to the distance between a switching point $X_o$ and the designated track position, so that the traveling distance of the optical head 10 after the switching of the adjustable target speed becomes approximately equal to the distance between the switching point $X_o$ and the designated track position.

In the above case, a table value $V_{tbl}$ for the adjustable target speed indicated by the dotted line of FIG. 4 is stored in the speed table 20 while a speed offset value $V_{off}$ for adjusting an access error of the optical head 10 is stored in the speed offset memory 21, and a reference speed is generated by releasing a reference speed signal $E_{ref}$ based on the difference between the above values. Assuming that the value of the access distance $X_e$ is represented by $X_l$ in FIG. 4, a value $V_l$ which corresponds to the value $X_l$ is read from a curved line indicating the transition of the adjustable target speed $V_{ref}$ and this value $V_l$ is set as an initial value. Then, the moving distance of the optical head 10 in the coarse access operation is determined with this initial value.

To adjust the access distance for the optical head 10 in the coarse access, the speed offset value $V_{off}$ is varied as necessary; the value of the adjustable target speed $V_{ref}$ at the time the optical head 10 reaches the switching point is changed to a switching point speed $V_o$; and the moving distance of the optical head 10 after it passes the switching point is changed.

The following description describes the coarse access control system further in detail. The coarse access control system includes a reference speed signal generation circuit 1 which has a first D/A (digital/analog) convertor 2, a second D/A convertor 3 and a differential circuit 4. As described later, the reference signal speed generation circuit 1 converts, upon receipt of an instruction from the CPU 5 (Central Processing Unit), the digital signals of the table value $V_{tbl}$ and the speed offset value $V_{off}$ into analog signals. The table value $V_{tbl}$ is released from the speed table 20, and the speed offset value $V_{off}$ is released from the speed offset memory 21 so as to be used as an offset value. After the D/A conversion, the circuit 1 performs a subtracting operation and generates the reference speed signal $E_{ref}$.

The reference speed signal $E_{ref}$ is sent to a comparator circuit 6 where a speed error signal is obtained from the difference between a speed detection signal and the reference speed signal $E_{ref}$. The speed detection signal corresponds to an actual speed V of the optical head 10 and is released from the speed detection circuit 13 for detecting the speed of the optical head 10.

The speed error signal from the comparator circuit 6 is amplified by a amplifier circuit 7 and then fed to a linear motor driving circuit 8. The linear motor driving circuit 8 functions to generate a driving current in accordance with a signal from the amplifier circuit 7. This driving current is supplied to the linear motor 9 functioning as the driving means so that the optical head 10 connected to the linear motor 9 is driven in a radial direction of an optical disk (not shown).

Installed in the optical head 10 is the optical head position sensor 11 composed of an optical scale or similar devices. The optical head position sensor 11 is connected to the position detection circuit 12 which detects the position of the optical head 10 in the radial direction of the optical disk by counting the number of position pulses released from the optical head position sensor 11.

The speed detection circuit 13 generates a speed detection signal by converting position pulses released from e.g., the optical head position sensor 11 (Frequency to Voltage conversion). The speed detection circuit 13 may be designed to detect a speed by differentiating two analog signals whose phase difference is 90° and which correspond to two different positions of the optical head 10 detected by the optical head position sensor 11 comprised of e.g. an optical scale.

The optical head 10 is provided with an actuator 14 for driving an objective lens installed in the optical head 10. The actuator 14 is provided with an objective lens position sensor 15 for detecting a position of an objective lens. The objective lens position sensor 15 releases a position signal to an objective lens lock control circuit 16. At the objective lens lock control circuit 16, the phase of the position signal is compensated to generate an error signal. This error signal is supplied to the actuator driving circuit 17 so that a lock control is performed on the objective lens. More concretely, when a tracking pull-in operation is performed at the coarse access completing position, making the light beam of the optical head 10 follow a designated track, such a lock control is performed to prevent the objective lens from oscillating at the position of the designated track (damped oscillation).

The function of the reference speed signal generation circuit 1 will be described below.

In accordance with whether the optical head 10 moves inward or outward on an optical disk, the table value $V_{tbl}$ recorded in the speed table 20 composed of e.g. a ROM (Read Only Memory) is sent, upon receipt of an instruction from the CPU 5, to either one of the first and second D/A convertors 2 and 3 installed in the reference speed signal generation circuit 1, while the speed offset value $V_{off}$, which corresponds to the access distance $X_e$ detected by the position detection circuit 12, is sent from the speed offset memory 21 composed of e.g. a RAM (Random Access Memory) to the other of the first and second D/A convertors 2 and 3.

For example, when moving the optical head 10 outward on the optical disk, the table value $V_{tbl}$ is sent to the first D/A convertor 2 from the speed table 20 and, meanwhile, the speed offset value $V_{off}$ is sent to the second D/A convertor 3 from the speed offset memory 21. Thereafter, an analog value $E_{tbl}$ of the table value $V_{tbl}$ supplied to the first D/A convertor 2 and an analog value $E_{off}$ of the speed offset value $V_{off}$ supplied to the second D/A convertor 3 are fed to the differential circuit 4. In the differential circuit 4, the reference speed signal $E_{ref}$ is generated based on the equation: $E_{ref} = E_{tbl} - E_{off}$ (the moving direction of the optical head: outward).

On the other hand, when moving the optical head 10 inward on the optical disk, the table value $V_{tbl}$ is sent to the second D/A convertor 3 from the speed table 20, while the speed offset value $V_{off}$ is sent to the first D/A convertor 2 from the speed offset memory 21. Thereafter, analog values $E_{off}$ and $E_{tbl}$ generated at the first and second D/A convertors 2 and 3 are fed to the differential circuit 4 where the reference speed signal $E_{ref}$ is generated based on the equation $E_{ref} = E_{off} - E_{tbl} = -(E_{tbl} - E_{off})$ (the moving direction of the optical head: inward). As has been described above, the polarity of the reference speed signal $E_{ref}$ is varied depending on the moving direction of the optical head 10.

Figure 3:
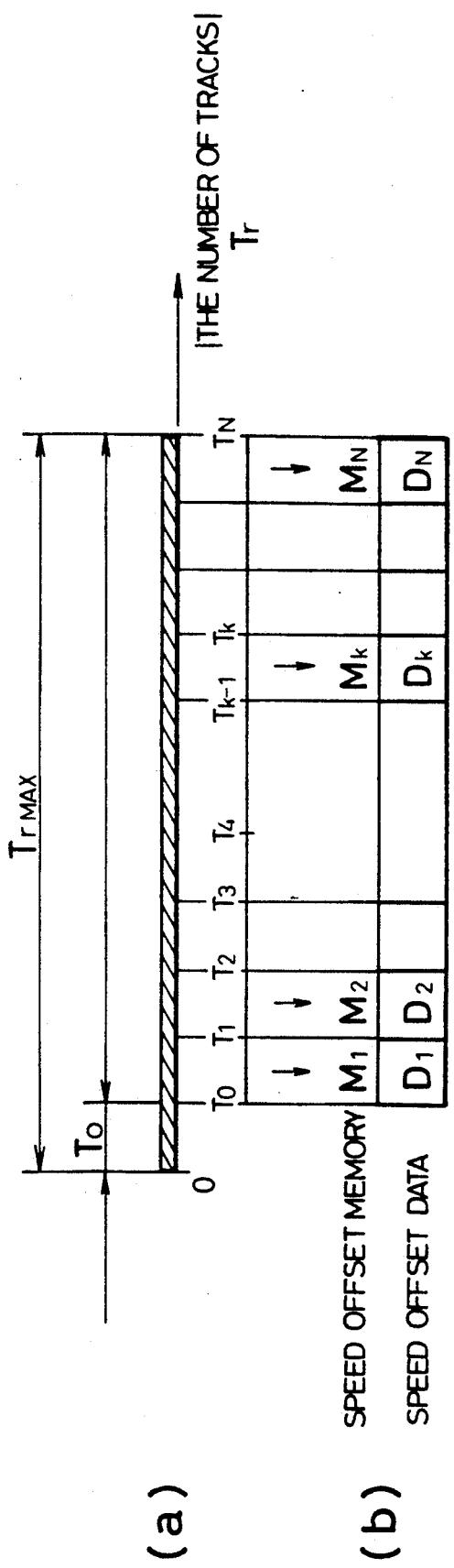

Now reference is made to FIG. 3 for explaining the speed offset memory 21.

In FIG. 3(a), $T_r$ represents the number of tracks existing in a distance from a designated track to be accessed to the present position of the optical head 10. The number of tracks $T_r$ corresponds to the access distance $X_e$. $Tr_{max}$ represents the number of tracks existing in a distance (i.e. access distance) when the optical head 10 travels from the inner-most track toward the outer-most track on the optical disk, or vice versa. $T_o$ represents the number of tracks in a distance within which a jump access (track jump access) can be executed. When the number of tracks $T_r$ is less than the number of tracks $T_o$, the designated track can be accessed only by having the objective lens jump from one track to another (fine access), without moving the optical head 10 itself.

When the number of tracks $T_r$ satisfies $T_o < T_r < Tr_{max}$, the coarse access is required and the distance in which the number of tracks $T_r$ exists is divided into N-number of ranges (i.e. a range $T_o$–$T_1$; range $T_1$–$T_2$; range $T_2$–$T_3$ ... range $T_{N-1}$–$T_N$). The speed offset memory 21 includes N-number of memories $M_1$ to $M_N$ which corresponds to the above N-number of ranges. Speed offset values $D_1$ to $D_N$, which correspond to the ranges $T_o$–$T_1$ to $T_{N-1}$–$T_N$, are stored in the memories $M_1$ to $M_N$. At the time the power of the apparatus is turned ON, the speed offset value $V_{off}$ shown in FIG. 4 is stored in the speed offset memory 21 as the speed offset values $D_1$ to $D_N$.

With reference to FIG. 4, the speed table 20 will be explained below.

The table value $V_{tbl}$ which varies as indicated by the dotted line is stored in the speed table 20. This table value $V_{tbl}$ corresponds to the reference speed signal $E_{ref}$ and is arranged in accordance with the variable value of the access distance $X_e$. As indicated by the solid line, the actual adjustable target speed $V_{ref}$ is a value obtained by subtracting the speed offset value $V_{off}$ stored in the speed offset memory 21 from the table value $V_{tbl}$. Acceleration in speed-reduction decreases as the optical head 10 approaches the designated track and when the access distance $X_e$ equals to a distance between the switching point $X_o$ and the designated position, the adjustable target speed $V_{ref}$ is changed to the switching point speed $V_o$. At the time the adjustable target speed $V_{ref}$ of the optical head 10 is decreased to the switching point speed $V_o$, the adjustable control target speed $V_{ref}$ is then changed to "0".

Figure 5:
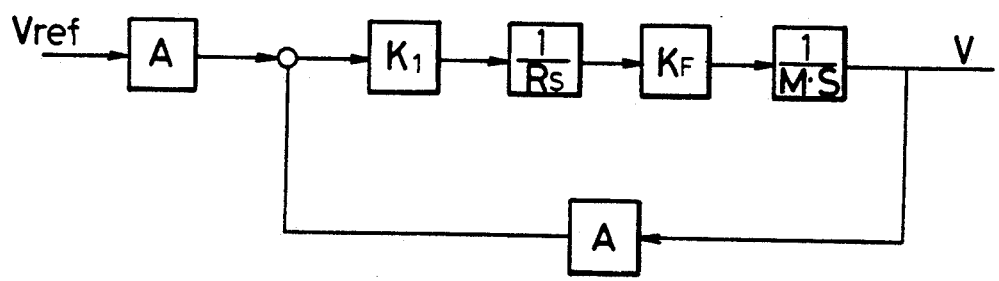

FIG. 5 is a block diagram showing a transfer function of the coarse access control system. The transition of the actual speed of the optical head 10 after the adjustable target speed $V_{ref}$ changes from the switching point speed $V_o$ to "0" at the switching point $X_o$ is given by:

$$V = V_o \cdot e^{-\{K_1 \cdot K_F A/(M \cdot R_S)\} \cdot t} \tag{1}$$

and a distance $X_v$ covered by the optical head 10 after the adjustable target speed $V_{ref}$ is changed from the switching point speed $V_o$ to "0" until the coarse access is completed is given by:

$$X_v = \{M \cdot R_S/(K_1 \cdot K_F A)\} \cdot V_o[1 - e^{-\{K_1 \cdot K_F A/(M \cdot R_S)\} \cdot t}] \tag{2}$$

where $V_{ref}$ is the adjustable target speed of the optical head 10;

V is the actual speed of the optical head 10;

A is the sensitivity of the speed detection circuit 13;

$K_1$ is the amplification of the amplification circuit 7;

$R_s$ is the current feedback resistance of the linear motor driving circuit 8 controlled by current;

$K_F$ is the force factor of the linear motor 9;

M is the weight of the optical head 10;

s is Laplace operator; and t is time elapsed after the adjustable target speed $V_{ref}$ changes from the switching point speed $V_o$ to "0".

Figure 6:
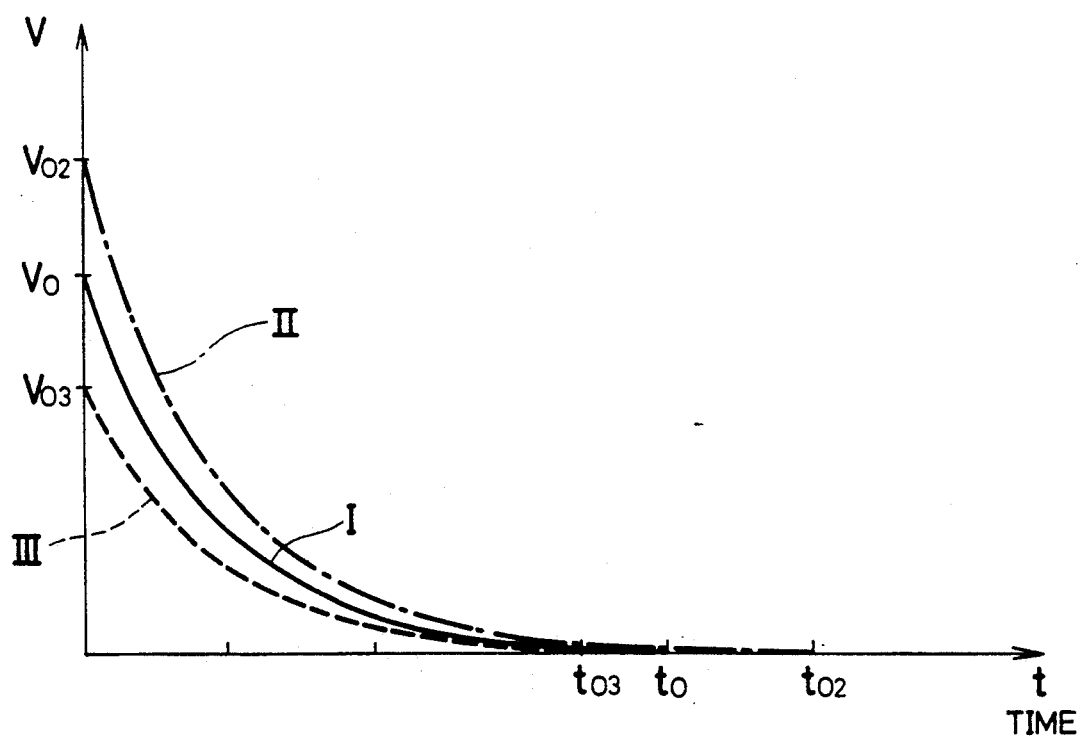
Figure 7:
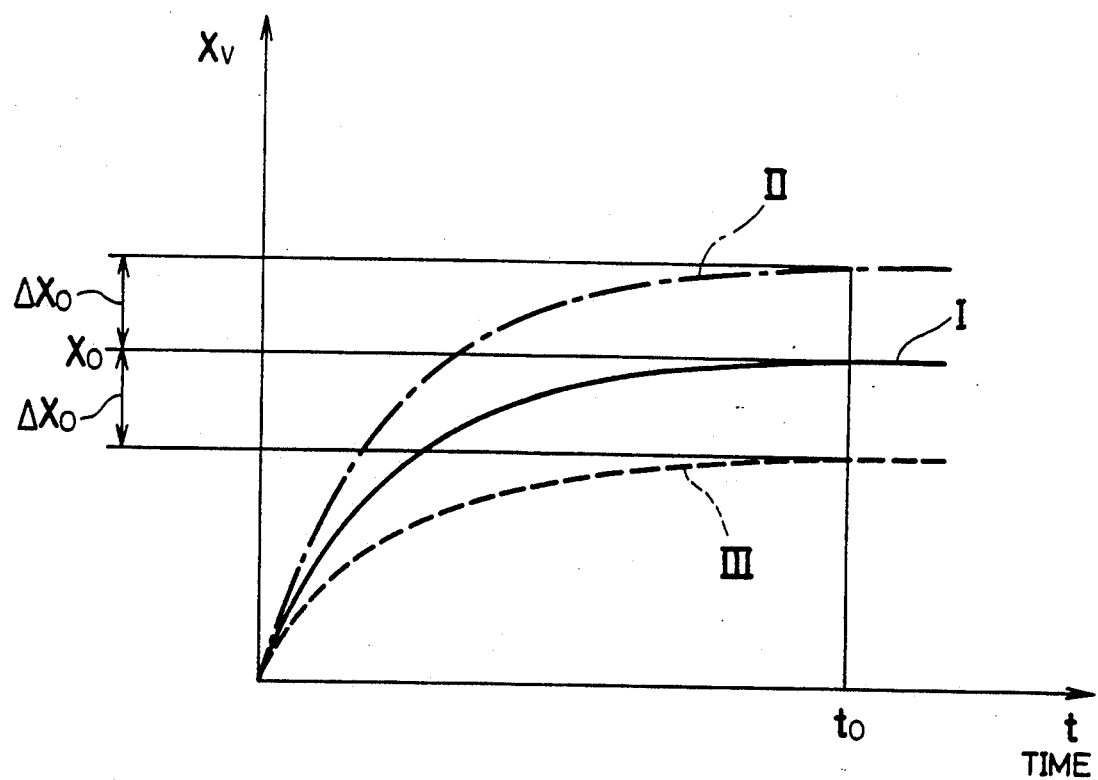
Figure 8:
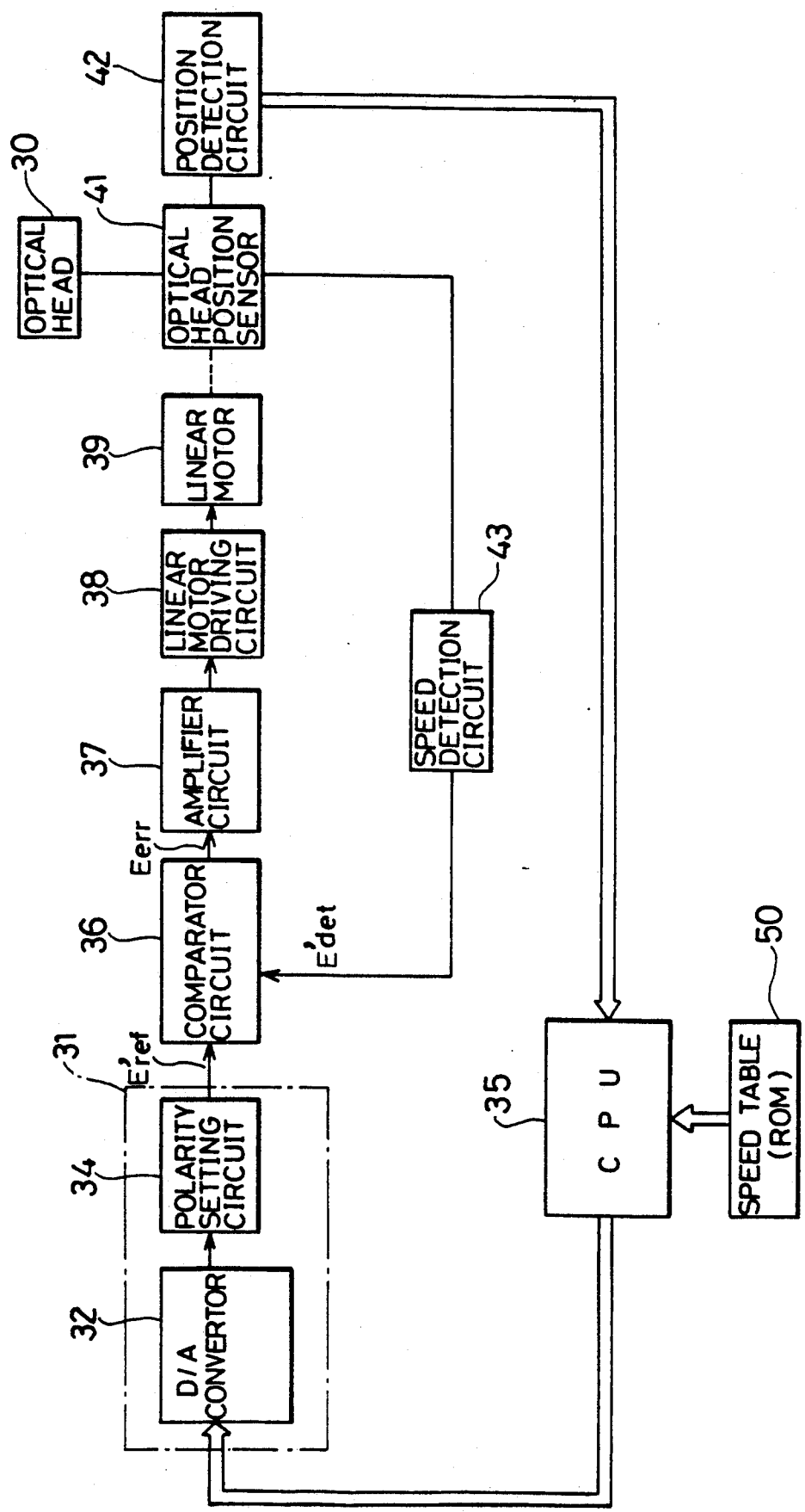
FIGS. 8 to 13 show a second embodiment of the present invention.

FIG. 6 shows the transition of the actual speed V after the adjustable target speed is changed to "0", and FIG. 7 shows the transition of the moving distance $X_v$ of the optical head 10 after the above changing time. More particularly, the curved line I shown in FIG. 6 indicates the transition of the actual speed V when a first access operation is performed after the power of the apparatus is turned ON, and the curved line I shown in FIG. 7 indicates the transition of the moving distance $X_v$ when a first access operation is performed after the power of the apparatus is turned ON. The actual speed V at the time the wait time $t_o$ of the optical head 10 has elapsed becomes approximately to "0" and the moving distance $X_v$ of the optical head 10 becomes approximate to a certain distance. By setting the above certain distance to be equal to the distance between the switching point $X_o$ and the designated track when the adjustable target speed is determined, the speed of the optical head 10 does not exceed a range of speed within which a tracking pull-in operation can be performed, the coarse access completing position. If a tracking pull-in operation is performed at that stage, the optical head 10 can be accurately positioned in a vicinity of the designated track.

However, the accurate access above-mentioned is achieved only when a coarse access is ideally performed. In reality, the optical head 10 more or less deviates from the designated track, upon completion of a coarse access due to variations in the accuracy of the optical head position sensor 11 and/or the expansion and shrinkage of the optical disk because of a change in ambient temperature.

To solve the above problem, the invention according to this embodiment is designed such that if the optical head 10 is positioned before the designated track by more than a predetermined distance upon completion of the coarse access of the first access operation, the speed offset value $V_{off}$ is reduced to increase the adjustable target speed $V_o$ at the switching point $X_o$. On the other hand, if the optical head 10 goes over the designated track by not less than a predetermined distance upon completion of the coarse access of the first access operation, the speed offset value $V_{off}$ is increased to reduce the adjustable target speed $V_o$ at the switching point $X_o$.

The curved lines II and III shown in FIGS. 6 and 7 respectively indicate the relationship between the actual speed V of the optical head 10 and the moving distance $X_v$ of the optical head 10 after it passes the switching point $X_o$, in the case a second access operation, wherein the access distance is substantially equal to that of the first access operation, is performed. Particularly, the curved line II shows the case where the speed offset value $V_{off}$ is reduced (assuming that the wait time of the optical head 10 is represented by $t_{o2}$ and the adjustable target speed is $V_{o2}$ in this case, $t_{o2} > t_o$ and $V_{o2} > V_o$) and the curved line III shows the case where the speed offset value $V_{off}$ is increased (assuming that the wait time of the optical head 10 is represented by $t_{o3}$ and the adjustable target speed is $V_{o3}$ in this case, $t_{o3} < t_o$ and $V_{o3} < V_o$).

As apparent from the curved line II, where the optical head 10 is positioned before the designated track by not less than a predetermined distance upon completion of the coarse access of the first access operation, when the second access operation is performed, the moving distance $X_v$ (i.e. the distance covered by the optical head 10 after the optical head 10 had passed the switching point $X_o$ until the wait time $t_{o2}$ has elapsed) exceeds the distance between the switching point $X_o$ and the designated track, and the optical head 10 is closer to the designated track compared with the first access operation at the time the coarse access of the second access operation is completed.

On the other hand, when the optical head 10 is positioned beyond the designated track by not less than a predetermined distance upon completion of the coarse access of the first access operation, the moving distance $X_v$ (i.e. the distance covered by the optical head 10 after the optical head 10 had passed the switching point $X_o$ until the wait time $t_{o3}$ elapsed) in the second access operation is less than the distance between the switching point $X_o$ and the designated track as indicated by the curved line III. In this case, the optical head 10 also accesses closer to the designated track compared with the first access operation when the coarse access of the second access operation is completed.

Accordingly, the speed offset value $V_{off}$ is changed such that the accuracy of the coarse access is improved as the number of access operations increases. Furthermore, since N-number of ranges each have an optimum speed offset value $V_{off}$ as shown in FIG. 3, the accuracy of the coarse access is highly improved irrespective of the access distance. As a result, the time required for the fine access can be saved, reducing the time required for the whole access operation.

Next, with reference to FIG. 2, there will be given an explanation of the fine access control system for performing a fine access including the steps of a tracking pull-in operation that is executed upon completion of the coarse access, and a jump access. In a fine access, the first switch SW1 and second switch SW2 are connected to the contact b, as has been described above.

After the completion of the coarse access, a tracking pull-in operation is performed for making a light beam from the optical head 10 follow the designated track. In this operation, a tracking error signal $T_{err}$ detected by the optical head 10 is supplied to a tracking control circuit 18. The tracking error signal $T_{err}$ is amplified and undergone a phase compensation in the tracking control circuit 18 so that a control signal $S_{act}$ and a control signal $S_{lm}$ are generated. The control signals $S_{act}$ and $S_{lm}$ are supplied to the actuator driving circuit 17 and the linear motor driving circuit 8 respectively. This allows the objective lens and the optical head 10 to be actuated so as to perform a tracking pull-in operation.

Thereafter, a jump access to the designated track is performed while reading track numbers from the ID sections of the optical disk. In this jump access, a pulse for making the objective lens jump in an outward direction and a pulse for making the objective lens jump in an inward direction are generated in a jump control circuit 19 upon receipt of an instruction from the CPU 5. These pulses are incorporated into the control signal $S_{act}$ as generated in the tracking control circuit 18. This permits the actuator 14 to be driven by the actuator driving circuit 17 and the objective lens to jump from one track to another.

Figure 1A:
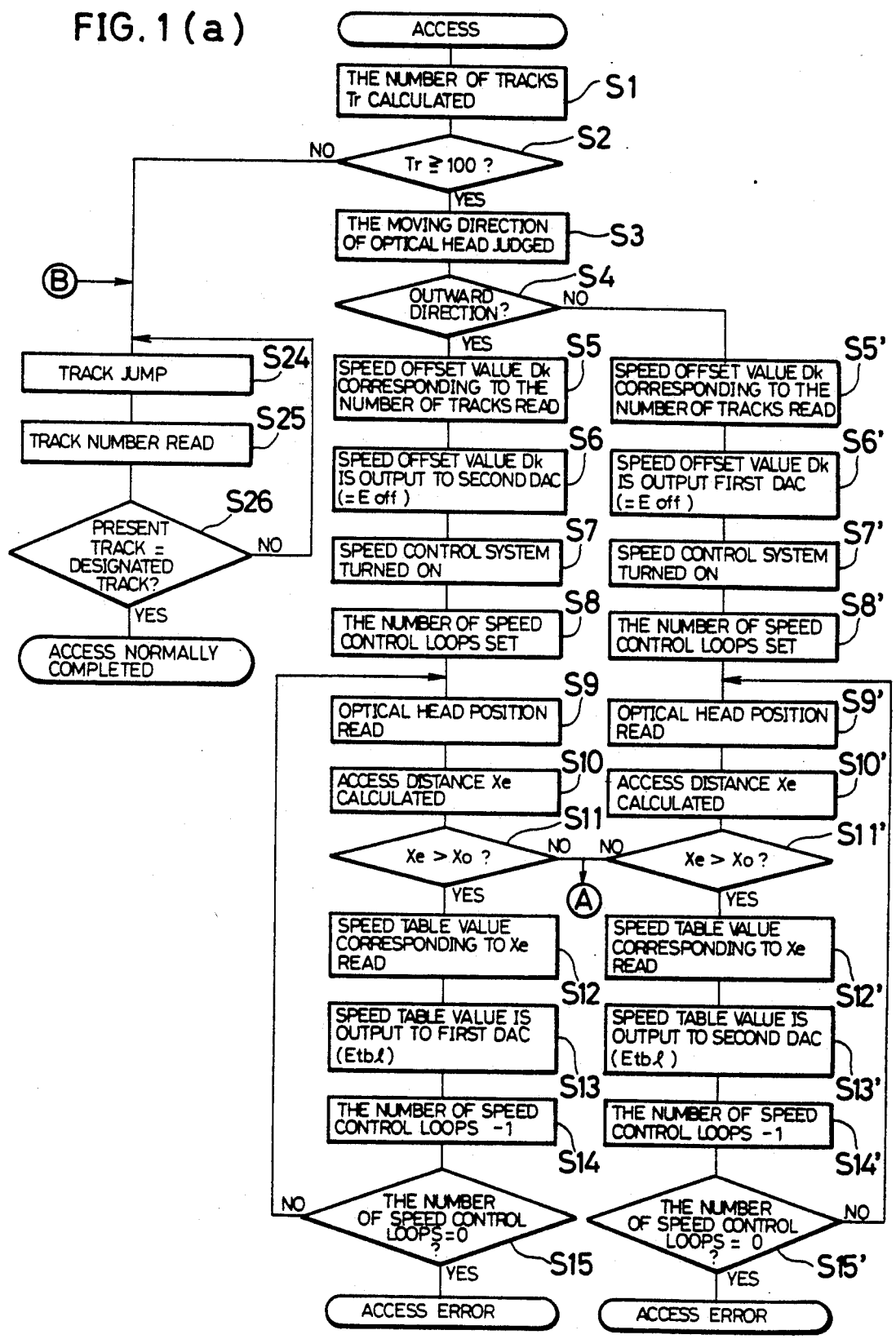
FIGS. 1(a) and 1(b) are flow charts showing the steps of an access operation.
Figure 1B:
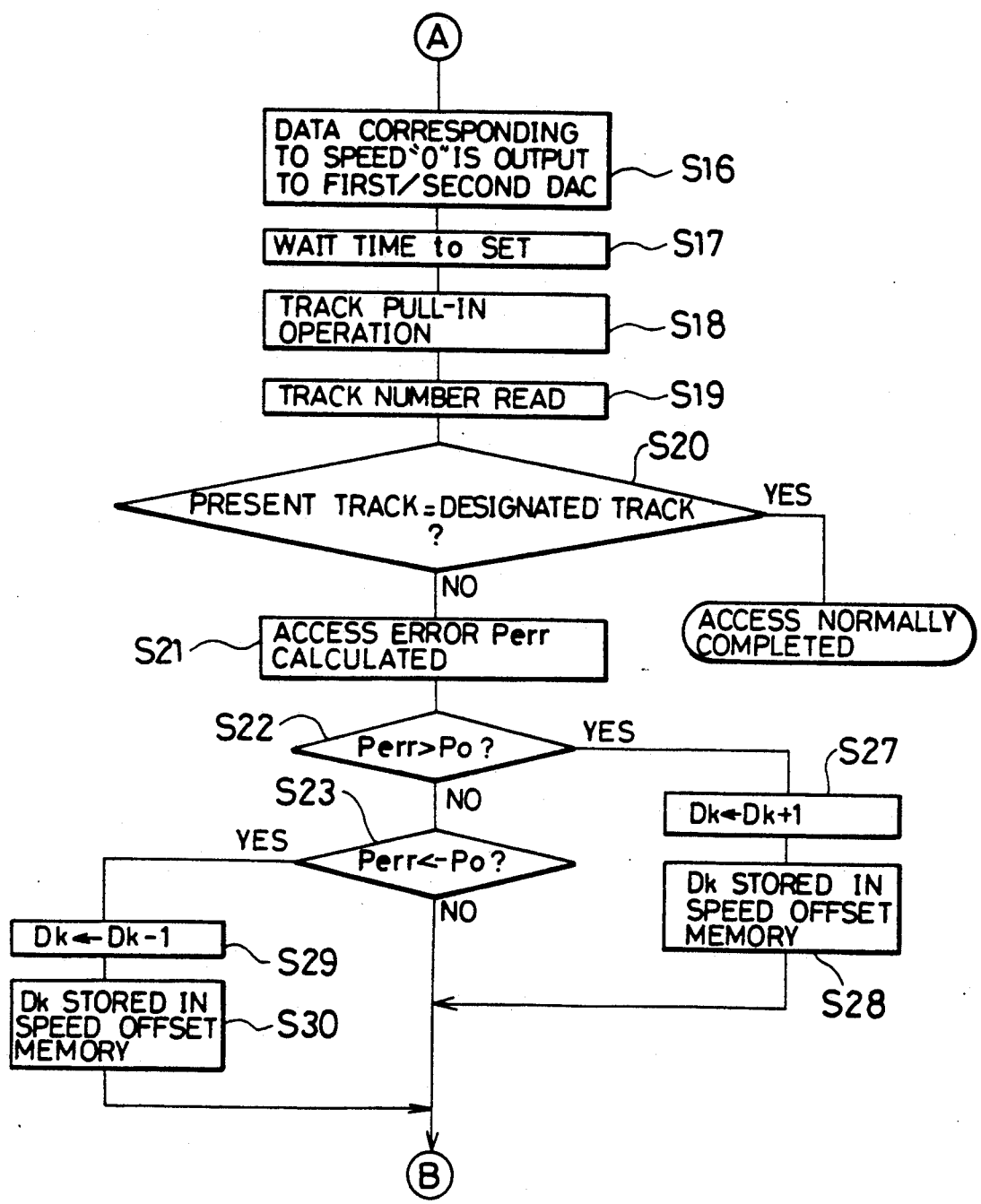

Now, reference is made to the flowchart of FIG. 1 for explaining the access operation in more detail.

When an external device (not shown) releases an instruction to access the designated track, the present position of the optical head 10 detected by the position detection circuit 12 is compared to the designated track by the CPU 5, thereby detecting an access distance therebetween. Based on the distance, the number of tracks $T_r$ corresponding to the access distance is obtained (Step 1).

The CPU 5 sequentially judges whether or not the number of tracks $T_r$ exceeds the number of tracks which can be accessed only by a jump access. For example, it is judged whether the number of tracks $T_r$ exceeds 100 tracks (Step 2).

If the number of tracks $T_r$ exceeds 100 tracks, a coarse access performed by the coarse access control system is necessary. More specifically, a moving direction of the optical head 10 is firstly detected by making a comparison between the designated track and a track on which the optical head 10 is presently positioned (Step 3). That is, the CPU 5 judges whether or not the moving direction of the optical head 10 for the coarse access is an outward direction (i.e. from an inner track toward an outer track) (Step 4), and if so, a speed offset value $D_k$ which corresponds to the number of tracks $T_r$ is read from the speed offset memory 21 and the speed offset value $D_k$ is released to the second D/A converter 3 (Step 6).

Then, the CPU 5 connects the first switch SW1 and the second switch SW2 to the contact a, thereby turning the coarse access control system (speed control system) ON (Step 7). The number of speed control loops (described later) is set in accordance with the number of tracks $T_r$ obtained in Step 1, and this number of loops is set in an inside memory (Step 8). Thereafter, the program enters in the speed control loop.

In the loop, the position of the optical head 10 is firstly read from the position detection circuit 12 (Step 9), and an access distance $X_e$ is calculated from the optical head 10 and the designated track position (Step 10). Then, it is judged whether the calculated access distance $X_e$ is more than the value of the switching point $X_o$ (Step 11).

If it is judged that the access distance $X_e$ is more than the value of the switching point $X_o$ (i.e. the optical head 10 has not reached the switching point $X_o$), a table value $V_{tbl}$ corresponding to the access distance $X_e$ is read out from the speed table 20 (Step 12) and the table value $V_{tbl}$ thus read is released to the first D/A converter 2 (Step 13).

The CPU 5 then reads the number of speed control loops from the inside memory and deducts "1" from this number (Step 14). The CPU 5 judges whether the number of speed control loops is "0" (Step 15), and if not, the program returns to Step 9 for executing the speed control loop again. On the contrary, if the number of speed control loops is "0" at Step 15, it is judged that an access error has occurred since the coarse access is not completed in spite of the fact that a predetermined number of loops is finished, and another access operation is commenced.

If it is judged in Step 4 that the moving direction of the optical head 10 is an inward direction, Steps 5' to 15' are performed for changing the polarity of the reference speed signal $E_{ref}$ (described before), and the details of these steps can be understood by referring to the explanation on Steps 5 to 15. The explanation on Steps 5' to 15' are therefore omitted.

If the access distance $X_e$ is lower than the value of the switching point $X_o$ in Step 11 or Step 11' (i.e. the optical head has reached the switching point $X_o$), a value corresponding to a speed "0" is inputted in the first and second D/A convertors 2 and 3, and the reference speed signal $E_{ref}(=0)$ is released. Then, the CPU 5 waits for the predetermined wait time $t_o$ until the actual speed of the optical head 10 becomes "0" (Step 17).

After the above wait time $t_o$ elapses, the CPU 5 terminates the speed control operation (coarse access) of the optical head 10, and connects the first switch SW1 and the second switch SW2 to the contact b so that the fine access control system is turned ON. Then, a tracking pull-in operation is performed (Step 18). After the completion of the tracking pull-in operation, a track number is read from the ID section of the track which has been pulled in the above pull-in operation (Step 19) and it is judged whether the track which is being accessed by the optical head 10 is the designated track (Step 20).

If the track being accessed is the designated track, the access operation is completed normally. If not, an access error (i.e. a position error $P_{err}$) is calculated based on the distance between the designated track and the track being accessed (Step 21). At that time, it is assumed that the polarity of the access error $P_{err}$ is negative in the case a tracking pull-in operation is performed before the optical head 10 has reached the designated track, while the polarity is positive in the case a tracking pull-in operation is performed after the optical head 10 has passed the designated track.

Thereafter, the CPU 5 judges whether the access error $P_{err}$ is more than a predetermined positive value $P_o$ (Step 22), and if so, the CPU 5 further judges whether the access error $P_{err}$ is less than a predetermined negative value $-P_o$ (Step 23). If the access error $P_{err}$ is not more than the predetermined positive value $P_o$ and not less than the predetermined negative value $-P_o$, the CPU 5 judges that the speed offset value $D_k$ which has been set in Step 5 is within an appropriate range and immediately starts a fine access without correcting the speed offset value $D_k$.

More specifically, a track jump is performed so that the objective lens is moved by the actuator 14 toward a direction in accordance with the polarity of the access error $P_{err}$ (Step 24). Then, a track number is read again (Step 25) and it is judged whether the track being accessed is the designated track (Step 26). If so, the access operation is normally terminated and if not, the program returns to Step 24 to perform the track jump again.

On the other hand, if the access error $P_{err}$ is more than the predetermined positive value $P_o$ in Step 22, the moving distance of the optical head 10 in the coarse access of the access operation is excessively long and the speed offset value $D_k$ set in Step 5 is too small. In this case, the speed offset value $D_k$ is corrected by adding "1" (Step 27), and after storing the speed offset value $D_k$ thus corrected in the speed offset memory 21 (Step 28), the program proceeds to Step 24. With the above arrangement, if another access operation, the access distance of which is substantially equal to that in an access operation previously carried out, is performed, the value of an access error in the second operation will be less than that in the first operation since the speed offset value $D_k$ has been corrected.

Likewise, if the access error $P_{err}$ is less than the predetermined negative value $-P_o$ in Step 23, the moving distance of the optical head 10 in the coarse access of the access operation is excessively small. In other words, the speed offset value $D_k$ set in Step 5 is too large. Therefore, the offset value $D_k$ is corrected by subtracting "1" therefrom (Step 29), and after storing the speed offset value $D_k$ thus corrected in the speed offset memory 21 (Step 30), the program proceeds to Step 24.

If it is judged in Step 2 that the number of tracks $T_r$ is less than 100 tracks, it is possible to access the designated track only by executing a fine access. The program therefore immediately proceeds to Step 24 and the operations in Steps 24 to 26 are executed as has been described above.

The following describes a second embodiment of the present invention while making reference to FIGS. 8 to 13.

Figure 10:
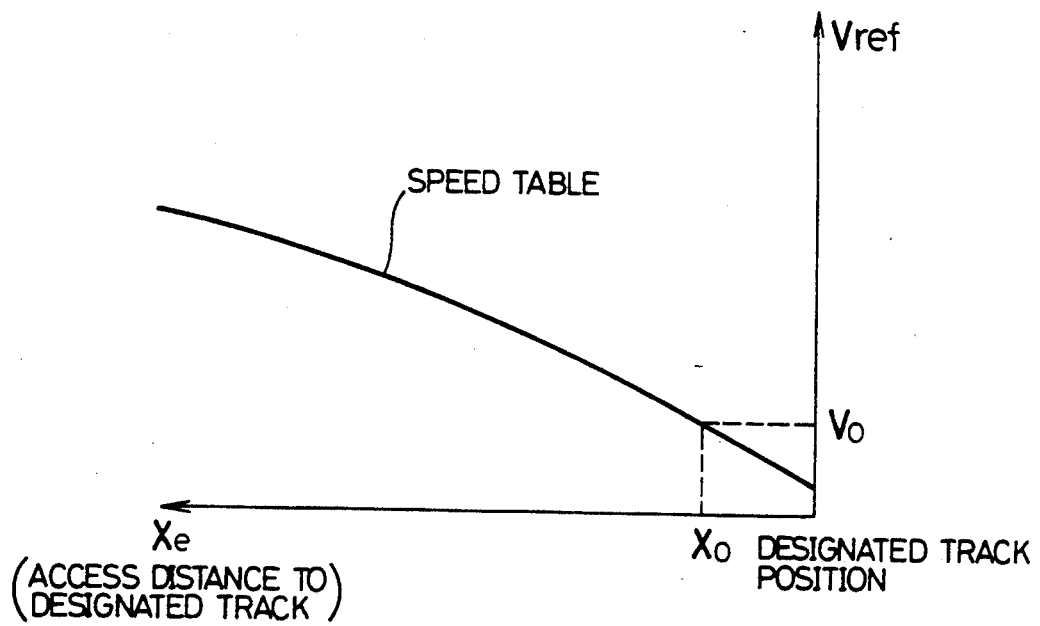

In the optical disk recording and reproducing apparatus according to this embodiment, the speed table is stored within e.g. a ROM 50, in the form of speed data that are varied according to the access distance $X_e$. The speed table is arranged such that acceleration in reducing the speed of an optical head 30 decreases as the optical head 30 approaches the designated track, and the optical head 30 has a predetermined switching point speed at a switching point positioned immediately before the designated track. The relationship between the adjustable target speed $V_{ref}$ and the access distance $X_e$ is shown in FIG. 10. In this embodiment, the switching point is denoted by $X_o$, the adjustable target speed $V_{ref}$ at the time the optical head 30 reaches the switching point $X_o$ is denoted by $V_o$. When the access distance $X_e$ is equal to the distance between the switching point $X_o$ and the designated track, the adjustable target speed $V_{ref}$ is equal to the speed $V_o$.

A CPU 35 functions as the calculating means for calculating the access distance $X_e$ from the position of the optical head 30 and the designated track position, based on an output from position detection circuit 42 for detecting the position of the optical head 30. The CPU 35 also serves as the control means for controlling a reference speed signal generation circuit 31 (described later) to release a fixed reference signal for generating a speed "0", instead of a reference speed signal $E'_{ref}$ (described later) during the predetermined wait time $t_o$. The CPU 35 also serves other control operations than those described above.

The reference speed signal generation circuit 31 releases the reference speed signal $E'_{ref}$ for generating the adjustable target speed $V_{ref}$ which corresponds to the access distance $X_e$, in accordance with the speed table 50. The reference speed signal generation circuit 31 comprises a D/A convertor 32 for converting speed data from the CPU 35 into a voltage signal, and a polarity setting circuit 34 for setting the polarity of the output of the D/A convertor 32 upon receipt of a signal from the CPU 35. This signal corresponds to the moving direction of the optical head 30.

The reference speed signal $E'_{ref}$ is input in a comparator circuit 36. The comparator circuit 36 generates a speed error signal $E_{err}$ by obtaining the difference between the reference speed signal $E'_{ref}$ and a speed detection signal $E'_{det}$ which corresponds to an actual speed V of the optical head 30 detected by a speed detection circuit 43 (described later).

The speed error signal $E_{err}$ from the comparator circuit 36 is amplified by an amplifier circuit 37, and output to a linear motor driving circuit 38. The linear motor driving circuit 38 drives a linear motor 39 (the driving means) which will be described later, in accordance with the speed error signal $E_{err}$. The linear motor driving circuit 38 also generates a driving current in accordance with the speed error signal $E_{err}$ amplified by the amplifier circuit 37 and releases it to the linear motor 39.

The linear motor 39 drives the optical head 30 in a radial direction of an optical disk upon receipt of the driving current from the linear motor driving circuit 38.

An optical head position sensor 41 outputs a signal relating to the present position of the optical head 30 and is made up of e.g. an optical scale attached to the optical head 30. The present position of the optical head 30 can be detected by counting the number of position pulses released from the optical head position sensor 41 by means of the position detection circuit 42.

The speed detection circuit 43 generates the speed detection signal $E'_{det}$, for example by converting position pulses released from the optical head position sensor 41 into voltage which is proportional to the pulse repetition frequency (F/V conversion). This speed detection signal $E'_{det}$ is released to the comparator circuit 36. The speed detection signal $E'_{det}$ may be generated by differentiating two analog signals whose phase difference is 90° and which correspond to two difference positions of the optical head 30 obtained by the optical scale.

Figure 9:
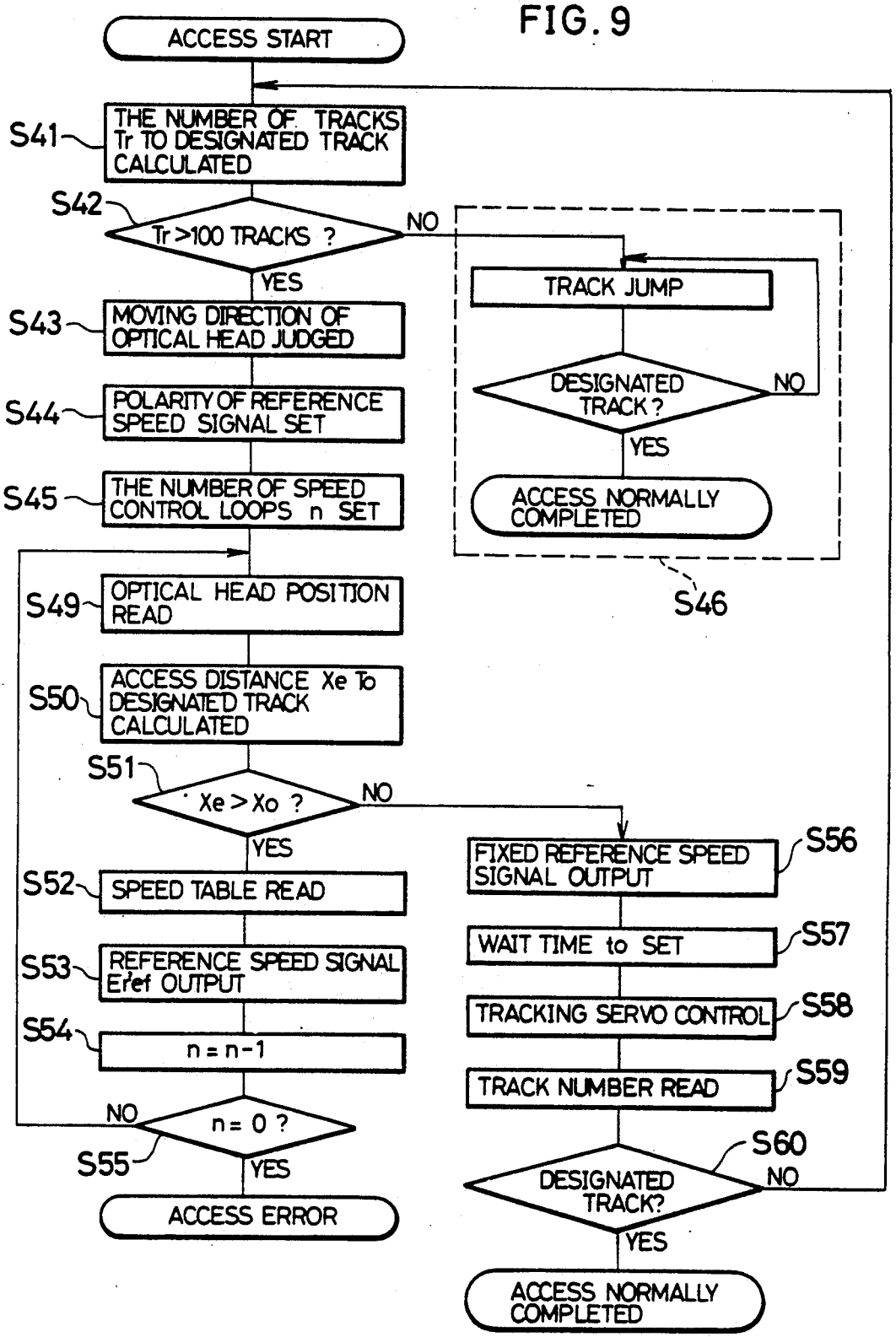

The operation for accessing a designated track with the optical head 30 in an apparatus having the above arrangement will be described, while making a reference to FIG. 9.

Upon receipt of an instruction to access a designated track with the optical head 30, the CPU 35 calculates the number of tracks $T_r$ (access distance) existing in a distance from the present track position to the designated track position (Step 41), and judges whether or not the number of tracks $T_r$ is more than e.g. 100 tracks (Step 42). If the number of tracks $T_r$ is more than 100, a moving direction of the optical head 30 is judged from the present track and the designated track (Step 43). The CPU 35 then releases a control signal according to the moving direction thus judged to the polarity setting circuit 34. The polarity setting circuit 34 sets a polarity of the reference speed signal $E'_{ref}$ upon receipt of the control signal (Step 44).

After the number n of speed control loops is set in a memory (not shown) (Step 45), the program enters in the speed control loop. In this loop, the CPU 35 reads the present position of the optical head 30 from the position detection circuit 42 (Step 49), and calculates the access distance $X_e$ from the present position of the optical head 30 and the designated track position (Step 50). Then, the CPU 35 compares the access distance $X_e$ thus calculated with the distance between the switching point $X_o$ and the designated track (Step 51), and if the access distance $X_e$ is longer than the distance between the switching point $X_o$ and the designated track, that is, the optical head 30 has not reached the switching point $X_o$ yet, the table value corresponding to the access distance $X_e$ is read from the speed table (Step 52). Based on the table value, the reference speed signal generation circuit 31 generates the reference speed signal $E'_{ref}$ (Step 53). The CPU 35 then reads the number n of speed control loops from the memory and subtracts "1" from the number n (Step 54). At that time, it is judged whether the number n is "0" (Step 55), and if so, it is judged that an access error has occurred. On the other hand, if the number n is not "0", the program returns to Step 49 to continue the speed control loop.

If it is judged in Step 42 that the number of tracks $T_r$ is not more than 100, that is, the optical head 30 is positioned on a track located within an allowable region, a fine access is performed (in other words, the designated track is accessed by performing jump access) (Step 46).

If it is judged in Step 51 that the access distance $X_e$ is not more than the distance between the switching point $X_o$ and the designated track, i.e., the optical head 30 has reached the switching point $X_o$, the CPU 35 releases a certain signal to the D/A convertor 32 so that the reference speed signal generation circuit 31 generates a fixed reference speed signal corresponding to the speed "0" instead of the adjustable target speed $V_{ref}$ (Step 56). Thereafter, the wait time $t_o$ required for the optical head 30 to stop is set (Step 57). After the wait time $t_o$ elapses and the optical head 30 stops, a tracking servo control is performed by an objective lens actuating device (not shown) provided in the optical head 30 (Step 58). Then, a track number is read from the ID section of the track accessed by the tracking servo control (Step 59), and it is judged whether the track being accessed by the optical head 30 is the designated track (Step 60). If so, the access operation is normally completed, if not, the program returns to Step 41.

The following description describes the setting of the switching point $X_o$, the switching point speed $V_o$ and the wait time $t_o$ in the above operation.

Assuming that:

$V_{ref}$ is the adjustable target speed;

V is the actual speed;

A is the sensitivity of a speed sensor composed of the optical head position sensor 41 and the speed detection circuit 43;

$K_I$ is the amplification of the amplifier circuit 37;

$R_s$ is the current feedback resistance of the linear motor driving means 38 controlled by current;

$K_F$ is the force factor of the linear motor 39;

M is the weight of the optical head 30;

s is Laplace operator; and t is time elapsed after the adjustable target speed $V_{ref}$ changes from the switching point speed $V_o$ to "0", in the transfer function of the control system provided in the access control device, the transition of the actual speed V of the optical head 30 after the adjustable target speed $V_{ref}$ changes from the switching point speed $V_o$ to "0" at the switching point $X_o$ is given by the same equation as the equation (1) mentioned in the first embodiment. A distance $X_v$ travelled by the optical head 30 after the adjustable target speed $V_{ref}$ is changed from the switching point speed $V_o$ to "0", is given by the equation (2) in the first embodiment.

Figure 11:
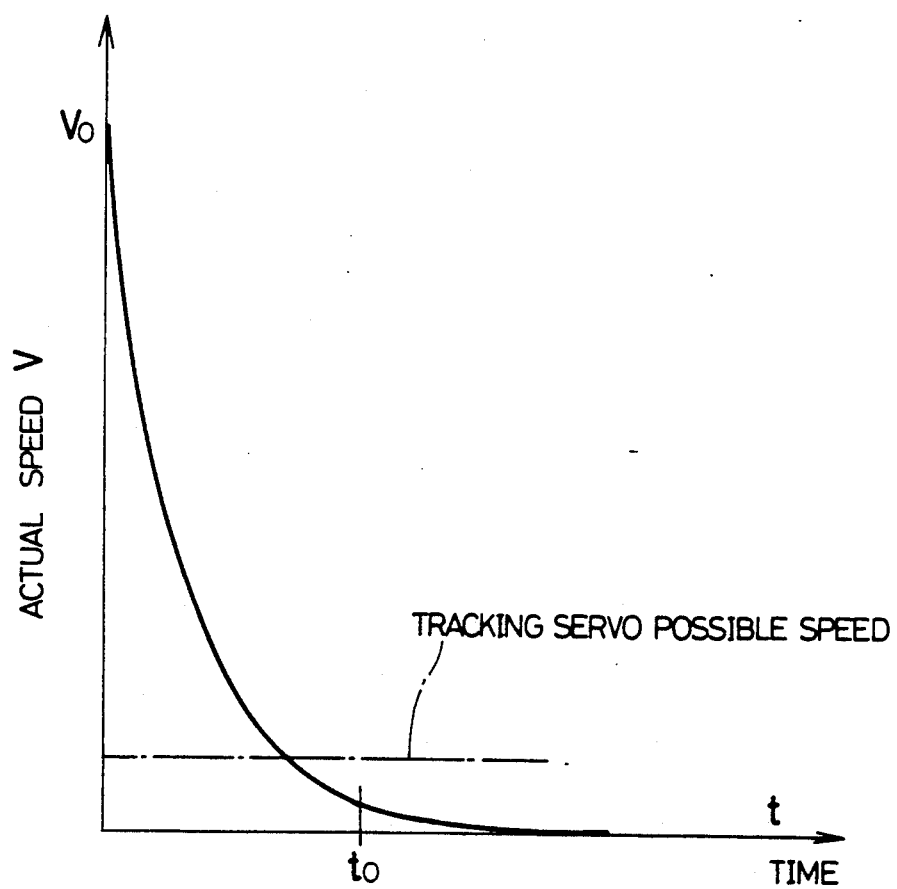
Figure 12:
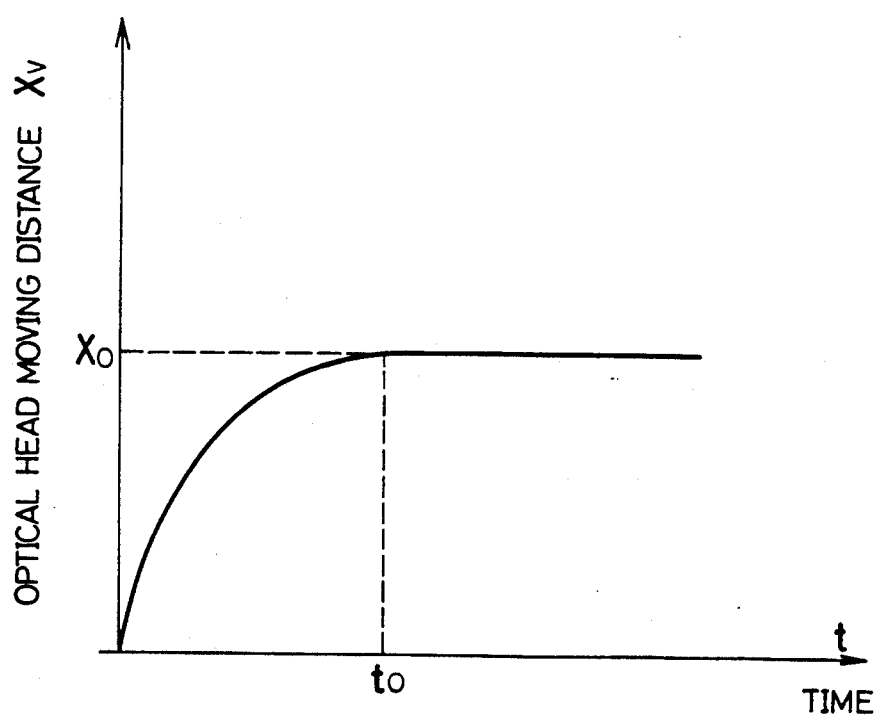

As time elapses, the actual speed V after the speed is switched, accordingly converges on "0" as shown in FIG. 11, while the moving distance $X_v$ of the optical head 30 after the speed is switched converges on a certain value as shown in FIG. 12.

The setting of the switching point $X_o$, the switching point speed $V_o$ and the wait time $t_o$ of the optical head 30 are determined as follows: the switching point speed $V_o$ is firstly determined. Then, a convergence value of the moving distance $X_v$ of the optical head 30 at that time is obtained and set as the switching point $X_o$. Then, the wait time $t_o$ is provisionally set within a range in which the moving distance $X_v$ of the optical head 30 substantially converges. If the actual speed V at that time does not exceed a speed range within which a tracking servo control can be performed by the objective lens actuating device, the aforesaid provisional wait time $t_o$ is employed, and if the actual speed V is more than the aforesaid speed range on the contrary, the wait time $t_o$ is set to be longer than the provisional one, so that the actual speed V does not exceed the speed range within which a tracking servo control can be performed.

Figure 13:
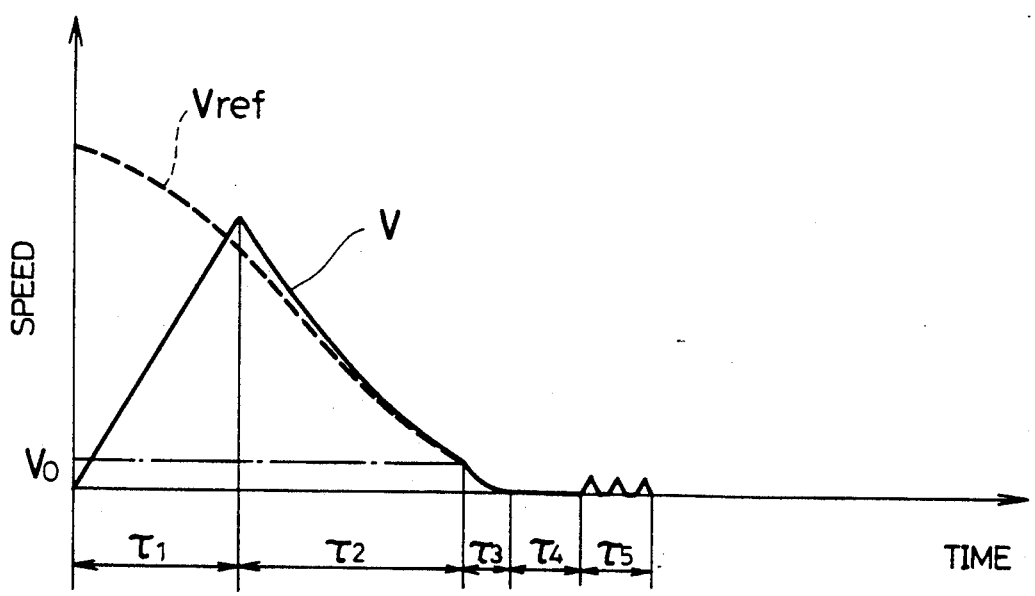
Figure 14A:
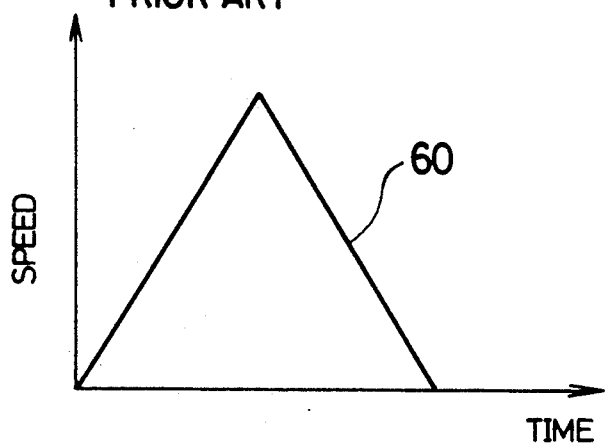
FIGS. 14(a) and 14(b) are graphs respectively showing a prior art in which a speed table used in a conventional access control device is employed.
Figure 14B:
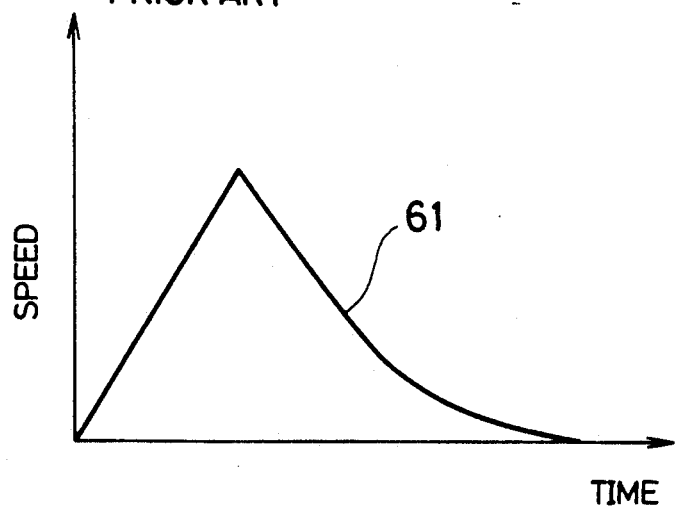

FIG. 13 shows the relationship between the adjustable target speed $V_{ref}$ and the actual speed V in the above-described track/access control operations. With reference to FIG. 13, a series of moving operations of the optical head 30 will be described below.

In the section $t_1$ of FIG. 13, the optical head 30 is moved at a full speed by the linear motor 39, since the difference between the adjustable target speed $V_{ref}$ and the actual speed V is great. In the section $t_2$, the speed of the optical head 30 is reduced in accordance with the adjustable target speed $V_{ref}$. In the section $t_3$, when the optical head 30 reaches the switching point $X_o$ located just before the designated track (i.e. the adjustable target speed $V_{ref}$ becomes equal to the switching point speed $V_o$), the adjustable target speed $V_{ref}$ is switched to "0". During the wait time $t_o$, the adjustable target speed $V_{ref}$ is maintained to be "0" and after an elapse of the wait time $t_o$, the optical head 30 substantially stops. In the section $T_4$, a stable tracking servo control is performed since the moving speed is sufficiently reduced in the section $T_3$ so as not to exceed a speed range within which a tracking servo control can be performed. If the track being accessed is the designated track, the access operation is completed. Otherwise, the designated track is accessed by jump access in the section $T_5$ and the access operation is then completed.

As described above, the speed table, according to which acceleration in speed reduction decreases as the optical head 30 approaches the designated track, is employed in this embodiment. This allows optical head 30 to be stably pulled in a predetermined allowable region proximate to the designated track, preventing speed deviation.

When employing the above speed table, the coarse access time is usually increased. In this embodiment, however, the coarse access time can be saved while covering a necessary distance for access operation, with such an arrangement that the optical head 30 is moved at a comparatively high speed, and the speed of the optical head 30 is rapidly reduced at the switching point $X_o$ located immediately before the designated track by releasing the fixed reference speed of "0" instead of the adjustable target speed $V_{ref}$.

In addition, the accuracy of the coarse access can be improved by setting the switching point $X_o$, the switching point speed $V_o$ and the wait time $t_o$ in view of the gain properties of the control system. Particularly, if the above setting is carried out in view of the gain properties of the control system such that when the optical head 30 reaches a vicinity of the designated track, the actual speed of the optical head 30 does not exceed a speed range within which a tracking servo control can be performed, the effect of the above rapid speed reduction can be controlled. This stabilizes the tracking servo control, resulting in reducing the access time.

As has been described above, the optical disk recording and reproducing apparatus of the present invention is designed such that speed offset values arranged according to access distances are stored in the offset value storing means beforehand anticipating the fact that an error is likely to occur in the access distance travelled by the optical head due to variations in the accuracy of the position detection sensor, the expansion of the optical head caused by a change in ambient temperature, and the like. During a coarse access, the optical head is actuated in accordance with an adjustable target speed which is obtained by adding or subtracting a speed offset value to or from a table value generated by the speed generating means in accordance with an access distance of the optical head. This arrangement improves the accuracy of the coarse access, operation resulting in the saving of the overall access time.

If the difference between the present position of the optical head and the designated track position exceeds a predetermined value after the completion of a coarse access, a speed offset value which corresponds to the access distance in the coarse access is corrected and the speed offset value thus corrected is stored in the speed offset value correcting means, whereby error can be reduced from the next access operation onward. As a result, access time can be gradually reduced as the number of access operations increases.

Further, the optical disk recording and reproducing apparatus of another embodiment makes it possible to reduce seek time while performing a tracking pull-in operation. This also enables the reduction of access time as well as the improvement of the accuracy of the access operation. By properly setting the switching point, the switching point speed and the wait time, not only can the accuracy of the coarse access be improved but also tracking servo control is stably performed.

The invention being thus described, it may be obvious that the same may be varied in many ways. Such variations are not to be regarded as a departure from the scope of the invention.

There are described above novel features which the one skilled in the art will appreciate give rise to advantages. These are each independent aspects of the invention to be covered by the present application, irrespective of whether or not they are included within the scope of the following claims.

What is claimed is:

1. An optical disk recording and reproducing apparatus comprising:
   an optical head;
   driving means for driving the optical head in a radial direction of an optical disk;
   a position detecting means for detecting a present position of the optical head and detecting a switching point;
   calculating means for calculating an access distance, based on the present position of the optical head and a position of a target track in response to the position detecting means;
   speed generating means for generating a table value in accordance with said access distance;
   speed offset value storing means for storing speed offset values for correcting an error in the access distance, the speed offset values being arranged according to a variable access distance and being updated for each coarse access;
   a first control means for (1) controlling the driving means to move the optical head in accordance with the adjustable target speed which is obtained by subtracting the speed offset value from the table value, before the optical head passes the switching point which is located before the target track position in the coarse access and for (2) changing the adjustable target speed to "0" after the optical head passes the switching point; and
   a second control means for judging whether the optical head is positioned on the target track upon completion of the coarse access, and for performing a fine access, after an elapse of a predetermined time, if the optical head is not positioned on the target track.

2. The optical disk recording and reproducing apparatus according to claim 1, further comprising speed offset value correcting means for correcting the speed offset value which corresponds to the access distance in a coarse access and for making the corrected speed offset value to be stored in the speed offset value storing means when an access error of the optical head in relation to the designated track exceeds a predetermined reference value upon completion of the coarse access.

3. The optical disk recording and reproducing apparatus according to claim 1, wherein said first control means comprises:
   a central processing unit;
   a speed table in which table values for an adjustable target speed of the optical head are stored;
   a speed offset value is written and read, the speed offset value being for adjusting an error in the access distance and corresponding to the distance between the present position of the optical head and the designated track;
   a reference speed signal generation circuit for obtaining a difference between data read from the speed table and the speed offset memory, and releasing a reference speed signal for generating the adjustable target speed which varies according to the access distance;
   a speed detection circuit for generating a speed detection signal which varies according to a moving speed of the optical head;
   an amplifier circuit for amplifying a speed error signal which is a difference between the speed detection signal and the reference speed signal;
   linear motor driving means for generating a linear motor driving current for driving the optical head, the current varying in accordance with an output of the amplifier circuit;
   an actuator for actuating an objective lens provided at the optical head;
   an actuator driving circuit for driving the actuator;
   an objective lens position sensor for detecting a position of the objective lens; and
   an objective lens lock control circuit for receiving a positional signal from the objective lens position sensor, generating an error signal by applying a phase compensation to the positional signal, and locking the objective lens so as not to oscillate when a tracking pull-in operation is performed at a coarse access completing position by making a light beam from the optical head follow the designated track, after the error signal is entered to the actuator driving circuit.

4. The optical disk recording and reproducing apparatus according to claim 3, wherein said speed detection circuit includes:
   an optical scale for measuring movement of the optical head on a predetermined scale;
   an optical head position sensor for generating pulses which vary according to a movement of the optical head in a radial direction of an optical disk in response to said optical scale; and
   a F/V convertor for converting the pulses to voltage which is proportional to a pulse repetition frequency.

5. The optical disk recording and reproducing apparatus according to claim 3, wherein said reference speed signal generation circuit comprises:
   a D/A convertor for converting a digital output of the speed table into an analog output;
   a D/A convertor for converting a digital output of the speed offset memory into an analog output; and a differential amplifier for calculating a difference between the outputs of the two D/A convertors to release the reference speed signal, wherein a moving direction of the optical head is controlled according to a polarity of an output of the differential amplifier.

6. The optical disk recording and reproducing apparatus according to claim 3, wherein said speed table stores table values for the adjustable target speed which varies according to the access distance, and is designed such that acceleration in reducing the speed of the optical head decreases as the optical head approaches the designated track and data corresponding to a reference speed is released therefrom when the access distance is at a predetermined value.

7. The optical disk recording and reproducing apparatus according to claim 6, wherein said speed offset memory includes N-number of readable and writable memories for storing the speed offset value, which correspond to equally divided N-number of sections of the access distance for which the coarse access is needed, and which respectively store a difference between the reference speed signal and the table value corresponding to the reference speed signal as the offset value when the power of the optical disk recording and reproducing apparatus is turned on.

8. An optical disk recording and reproducing apparatus comprising:

an optical head;

driving means for driving the optical head in a radial direction of an optical disk;

position detecting means for detecting a present position of the optical head;

speed detecting means for detecting a moving speed of the optical head;

calculating means for calculating an access distance, based on the present position of the optical head and a position of a designated track;

speed generating means for generating an adjustable target speed which corresponds to the access distance, in accordance with a speed table according to which acceleration in reducing a speed of the optical head decreases as the optical head approaches the designated track and the optical head has a predetermined switching point speed at a switching point located just before the designated track;

control means for generating a speed "0" to replace the adjustable target speed, judging that the optical head has reached the switching point and maintaining the speed "0" during a predetermined wait time until the optical head stops; and means for driving the driving means in accordance with an error signal based on a difference between an output of the speed detecting means and an output of the speed generating means.

9. The optical disk recording and reproducing apparatus according to claim 1 or 8, wherein said position detecting means includes a position detection sensor for generating position pulses the number of which vary in accordance with a position of the optical head in the radial direction of the optical disk and detects a present position of the optical head by counting the number of the position pulses.

10. The optical disk recording and reproducing apparatus according to claim 8, wherein said speed generating means comprises:

a D/A convertor; and a polarity setting circuit for setting a polarity of the adjustable target speed to determine a moving direction of the optical head, and wherein the moving direction of the optical head is controlled by the polarity thus set.

11. The optical disk recording and reproducing apparatus according to claim 8, wherein said position detecting means comprises a position detection sensor having an optical scale for measuring movement of the optical head on a predetermined scale and for releasing pulse signals relating to a present position of the optical head.

12. The optical disk recording and reproducing apparatus according to claim 11, wherein said speed detecting means includes a F/V convertor for converting the pulse signals from the position sensor into voltage which is proportional to a pulse repetition frequency.

13. The optical disk recording and reproducing apparatus according to claim 11, wherein said speed detecting means for detecting the moving speed of the optical head by differentiating two analog signals whose phase difference is 90° and which are released from the optical scale based on the position of the optical head.

14. A process for accessing a designated track on an optical disk, comprising the steps of:

calculating an access distance, based on a present position of an optical head and a designated track;

reading a speed offset value for adjusting an error in a coarse access, the speed offset value corresponding to said access distance;

judging whether the optical head reaches the designated track after the completion of the coarse access;

setting an adjustable target speed to "0" when the optical head is not positioned on the designated track and an error in the coarse access is not greater than a predetermined value;

setting a wait time of the optical head;

correcting the speed offset value to store, when the optical head is not positioned on the designated track and the error in the coarse access exceeds the predetermined value; and performing a fine access by a track jump.

15. A process of preforming at least one coarse access before an optical head reaches a switching point and at least one fine access after the optical head reaches the switching point, comprising the steps of:

detecting a position of the optical head upon completion of the coarse access;

increasing an adjustable target speed at the switching point by decreasing a speed offset value, when the optical head is positioned not less than a predetermined distance before a designated track upon completion of the coarse access;

setting an adjustable target speed to "0" when the optical head is not positioned on the designated track and an error in the coarse access is not greater than a predetermined value; setting a wait time of the optical head; and decreasing the adjustable target speed at the switching point by increasing the speed offset value, when the head exceeds the designated track by not less than the predetermined distance upon completion of the coarse access.

16. A process of performing a fine access in the case the number of tracks existing in an access distance from a present position of an optical head to a designated track is not more than a reference number, and performing a coarse access in the case the number of tracks is more than the reference number, comprising the steps:

obtaining the access distance, based on the present position of the optical head and the designated track;

judging whether said access distance is more than the distance of a switching point from the designated position, the access distance corresponding to said reference number;

reading a table value corresponding to the access distance when the access distance is more than the distance of the switching point from the designated position;

setting an adjustable target speed to "0" when the access distance is not more than the distance of the switching point from the designated position;

setting a wait time of the optical head;

performing a tracking servo control when the optical head is in a stable condition after the wait time elapses; and judging whether a track to which the optical head is accessing is the designated track, reading a track number from an ID section of a track.

* * * * *